United States Patent [19]

Wannyn

[11] 4,006,818
[45] Feb. 8, 1977

[54] PACKAGING SHELL WITH HINGED BOTTOM WALL

[75] Inventor: Albrecht Leo Pieter Wannyn, Vught, Netherlands

[73] Assignee: Hamido B.V., 's-Hertogenbosch, Netherlands

[22] Filed: Nov. 21, 1973

[21] Appl. No.: 417,885

[30] Foreign Application Priority Data

Nov. 28, 1972 Netherlands .................. 7216142
Aug. 22, 1973 Netherlands .................. 7311587

[52] U.S. Cl. .............................. 206/564; 206/486
[51] Int. Cl.² ....................................... B65D 1/34
[58] Field of Search ............ 206/72, 486, 446, 531, 206/532

[56] References Cited

UNITED STATES PATENTS

| | | | |
|---|---|---|---|
| 2,720,969 | 10/1955 | Kendall ..................... | 206/72 UX |
| 2,767,532 | 10/1956 | Bossi ......................... | 206/538 X |
| 2,883,061 | 4/1959 | Moore ....................... | 206/72 UX |
| 3,357,548 | 12/1967 | Freeman, Jr. et al ........ | 206/421 X |
| 3,467,247 | 9/1969 | Weiss ........................ | 206/72 |
| 3,689,458 | 9/1972 | Hellstrom ................... | 206/531 X |
| 3,764,004 | 10/1973 | Forbes, Jr. ................. | 206/45.14 |

*Primary Examiner*—Leonard Summer
*Attorney, Agent, or Firm*—John W. Logan, Jr.

[57] ABSTRACT

A package formed from a film of relatively stiff material is provided having an upwardly opening recess for containing an article. At least a portion of opposite side walls of the recess are inclined inwardly to engage and hold the article in the recess. An integral hinge is provided in the package along an axis of the recess permitting the base of the package to be bent along the hinge line to a position where the normally inwardly inclined side walls are parallel to one another to allow insertion of article into the recess. Thereafter, when the package assumes its flat position the walls of the recess incline inwardly and retain the article in the package. Also disclosed is a mold for forming the package and a method for inserting an article into the package.

12 Claims, 7 Drawing Figures

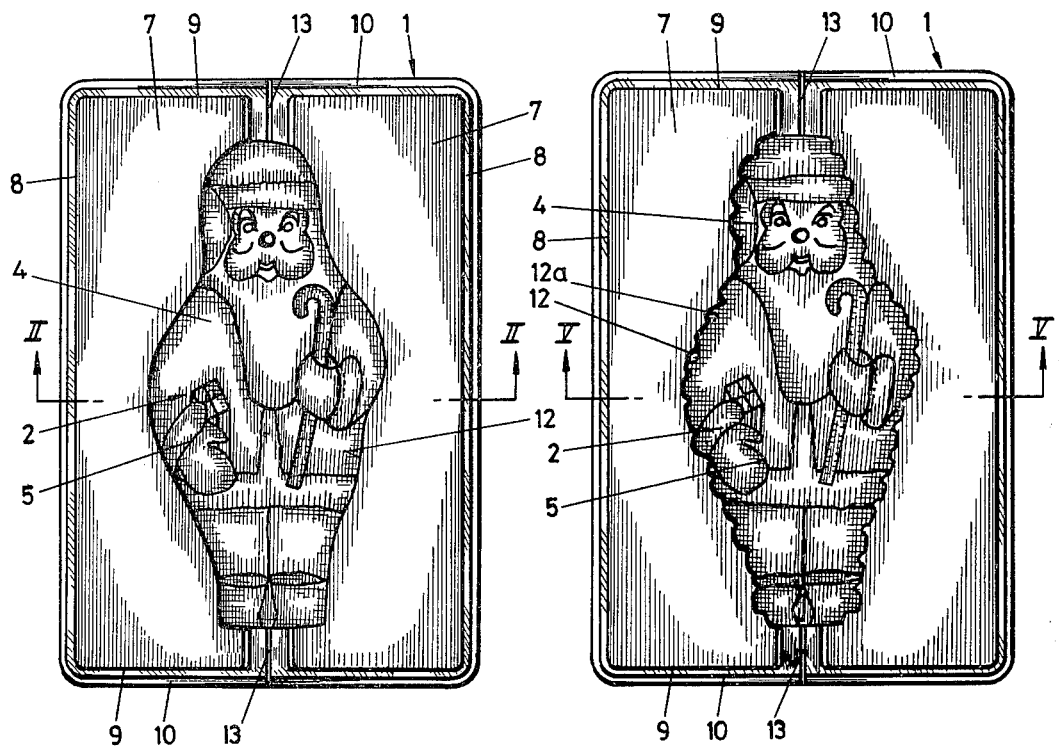
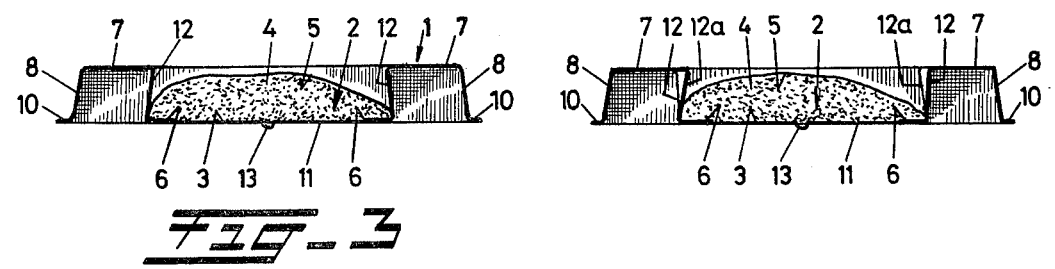
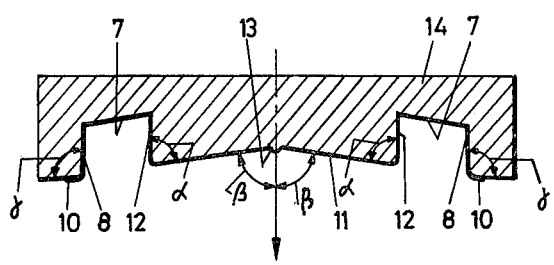

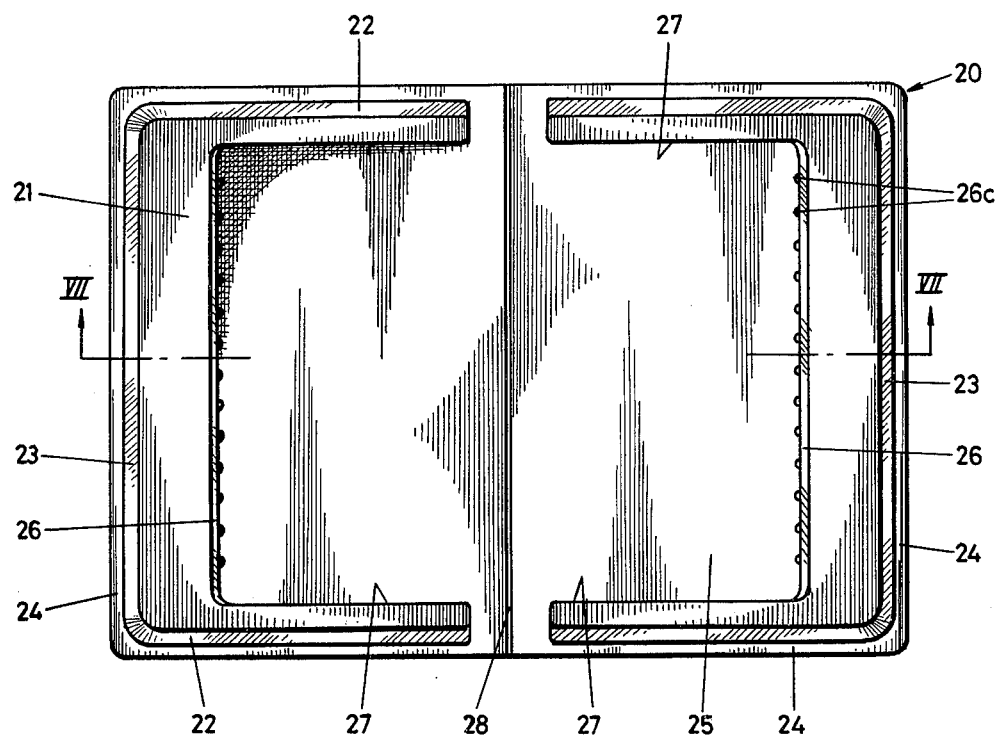
Fig_6
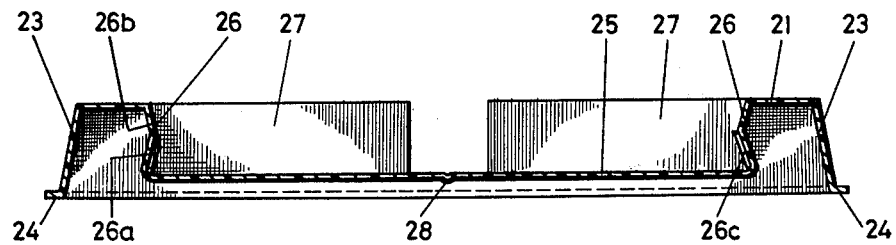
Fig_7

PACKAGING SHELL WITH HINGED BOTTOM WALL

The present invention principally relates to a package for an article having a peripheral edge of any shape, which package has been formed in such a manner that at least the front side of the article is visible and the article cannot fall out of the package also when the latter is turned upside down. With "article" in particular a figure or a letter of chocolate is meant.

Hitherto, figures and the like of chocolate with a flat bottom and an embossed front side are covered with a printed preformed aluminium foil which with a flange extends beyond the peripheral edge of the chocolate figure. The chocolate figure, together with the aluminium foil disposed thereover, is then placed on a rectangular sheet of cardboard. Onto this a second sheet of cardboard is placed which has a cut out portion corresponding to the contour of the figure. Both cardboard sheets are stapled or pasted onto each other so that the chocolate figure is held in place by the flange edge of the aluminium foil.

It will be appreciated that this manner of packing is very laborious and is difficult to perform entirely mechanically.

Each rectangular package is subsequently inserted in a cardboard outer sleeve which is either or not provided with a window.

Apart from requiring a lot of manual labour and being expensive the known manner of packing chocolate figures additionally has the further disadvantage that in rough transportation the chocolate figure tends to act as a knife at the cut out opening and slides under the flange of the aluminium foil thereby causing the chocolate figure to lie loose in the sleeve with the attendant risk of fracture.

The object of the invention is to provide a package which can be economically made mechanically and additionally permits mechanical packing.

According to the invention the package for that purpose consists of a shell produced from a film by deep drawing which has its open side facing down, in which shell a recess is formed which has its open side facing up and has such a shape that the outer circumference of the article fits into it and a depth which is at least equal to the greatest thickness of the article, which recess in its bottom has a hinge line extending throughout the entire package, the walls of that recess or parts of these walls being inclined to the bottom of the recess at an angle which is smaller than 90°.

Due to the shape of the recess being adapted to the circumference of the article the latter cannot move in the recess in the lateral direction. In the direction perpendicular thereto the article is held in the recess by the converging walls or wall portions of the recess also when the package is turned upside down.

Apart from being suitable for chocolate figures, the package according to the invention is also very suitable for chocolate letters. The recess is then preferably of rectangular shape with the hinge line parallel to the short walls of the rectangular recess, only these walls or parts of these walls being inclined to the bottom of the recess at an angle which is smaller than 90°. The recess, due to its rectangular shape, is particularly suitable for receiving chocolate letters because all these, at least all letters of a given size, have the same height. The upper and lower edge of the letter are thus firmly gripped by the short walls or portions of the short walls of the rectangular recess.

The only purpose of the long walls of the rectangular recess is to enclose a letter in the recess in the transverse direction so that they consequently may be perpendicular to the bottom.

In a package of also rectangular exterior shape the hinge line preferably extends along the short axis of symmetry of the rectangular package.

It will be appreciated that although the converging configuration of the walls or wall portions is of great usefulness for holding the article in a recess it impedes the insertion of the article therein.

The converging shape is also an impediment for producing the package by deep drawing from a film of plastic material. In producing a shell by deep drawing a plastic film is generally fed from a reel. In the forming machine this film is fastened in place with clamps or the like and pre-heated. The film is then blown or sucked into the deep drawing mould by overpressure or vacuum.

It is common knowledge that it is not possible or at least extremely difficult to remove a deep drawn shell from or deep drawing mould when the walls are not clearing.

The converging form of the walls or parts of the walls of the recess which is desirable for holding fast the article produces no difficulties in the method of packing an article when according to the invention the package is fed to a packing station in a position in which it is buckled open along the hinge line, in which station the article is deposited in the recess, whereupon the package is brought into the unbuckled position in which the two bottom parts of the recess lie in the same plane.

Hereafter, when desired, the filled packages may be inserted in a cardboard sleeve in the conventional manner.

According to the invention the deep drawing mould for producing a package from a film of plastic material is constructed in such a manner that the package is formed to a configuration which is buckled along the hinge line.

In this manner it is possible to produce a package of which the walls or parts of the walls of the recess are inclined to the bottom of the recess at an angle which is smaller than 90°, while these walls are still self-releasing from the deep drawing mould.

The invention will now be further explained with reference to the drawing which shows several exemplary embodiments.

FIG. 1 is a plan view of a first embodiment of a package according to the invention;

FIG. 2 is a section along the line II—II of FIG. 1;

FIG. 3 is a cross-section through a deep drawing mould designed for producing the package according to FIGS. 1 and 2;

FIGS. 4 and 5 are in principle similar to FIGS. 1 and 2 and show a second embodiment;

FIG. 6 is a plan view of a third embodiment of a package according to the invention;

FIG. 7 is a section along the line VII—VII of FIG. 6.

The package 1 according to FIGS. 1 and 2 is particularly intended for packing a chocolate figure having a flat rear side 3 and an embossed front side 4. As example a Santa Claus is shown. Normally, the front side 4 is covered by a printed preformed aluminium foil indicated with 5. The shape of this foil 5 corresponds with the shape of the front side 4 of the chocolate FIG. 2. The foil 5 in a known manner extends with a certain width beyond the peripheral edge of the figure so that a flange 6 is formed.

In the known package the figure is held between the two cardboard sheets because of the flange being gripped therebetween. The figure itself then projects outwardly through a window in the upper cardboard sheet.

For packing according to the invention it is not necessary to have the flange 6 projecting and it is folded down on the rear side 3 about the peripheral edge of the FIG. 2. By this expedient the FIG. 2 after removal from the package and while it is being packed is less vulnerable. Moreover, the aluminium foil 5 is better held in position on the figure. In order to allow such folding down of the flange 6 a plurality of radial notches have been made therein. FIG. 2 of the drawing illustrates how the flange 6 has been folded down. The radial notches are not visible.

The package 1 according to FIGS. 1 and 2 has been formed by deep drawing, conventionally starting from a film of plastic material.

As appears from FIGS. 1 and 2 the package 1 is substantially in the form of a shallow shell, the open side of which is facing down. The bottom of the shell, i.e. the upper surface of the package, is indicated with the numeral 7. The long outer walls of the shell are indicated with 8 and the short ones with 9. Along the outer walls 8, 9 there is further a flange 10 which is of no essential significance for the package but has a stiffening effect on its upper edge.

The top 7 has a depression or recess formed therein of which the bottom is indicated with 11 and the side walls with 12. The shape of this recess is adapted to the shape of the chocolate FIG. 2.

Along the long axis of symmetry of the package the bottom 11 throughout it length is formed with a hinge line 13.

It can be seen in FIG. 2 that the recess extends as far as the outer walls 9 of the package. These extending portions of the recess have only a small width in order not to unnecessarily weaken the package 1.

It can be seen in FIG. 2 that the side walls 12 of the recess are inclined to the bottom 11 at an angle of less than 90°, for instance 80°.

The inclination of the outer walls 8 and 9 is of no importance for the purpose of the package but should be less than 90° in order to allow the package to be removed from the mould when being formed. This is explained later on.

It will be appreciated that as a result of the inwardly inclined side walls 12 the article 2 cannot fall out of the recess even if the package is turned round through 180°. Inserting the article in the package, however, would indeed present difficulties if the package could not hinge along the hinge line 13. As appears from FIG. 3 anticipating the formation of the package, the latter leaves the vacuum drawing mould indicated with 14 in FIG. 3 in a buckled position.

It will be appreciated that in this position the walls 12 do not constitute an impediment for inserting the chocolate figure. Before inserting the figure the package may be buckled open still further. When the packages thus are fed to a packing station in the buckled-open condition, for instance with an endless belt and together with the chocolate figures, it is possible to manually or mechanically dispose a figure in each recess, whereupon the package is straightened out and the figure is enclosed in the recess.

In FIG. 3 the vacuum drawing mould 14 is shown in an upside down position in order to allow a better comparison with FIGS. 1 and 2. The ducts which are normally present in such a mould for drawing a vacuum are not shown.

Assuming that the side walls 12 of the recess are still clearing when they are parallel to the direction of withdrawal of the package from the vacuum drawing mould, which direction is indicated with an arrow in FIG. 3, it will be evident that the angle $\alpha$ between the side walls 12 and the bottom 11 of the recess equals the angle $\beta$ which existed between the bottom 11 of the recess and therefore also the corresponding surface of the vacuum drawing mould and the direction of the arrow.

The smaller one wishes the angle $\alpha$ to be, the smaller also the angle $\beta$ should be chosen.

For a better clearance, however, one will not wish to have the side walls 12 parallel to the direction of the arrow but rather choose the angle $\alpha$ lightly larger. As long as $\alpha$ remains smaller than 90° this is possible without more ado. The most suitable value for the angle $\alpha$ must be determined experimentally.

What has been said for the side walls 12 also holds good for the outer walls 8 but then in the opposite direction. The angle $\gamma$ which when the walls 12 and 8 are parallel to the direction of the arrow is the complement of the angle $\alpha$ will preferably be chosen slightly larger then has been drawn. Therefore no limit value can be fixed. As long as at the location where the recess has its greatest width sufficient width remains for the surface 7 no difficulties arise. This, too, is a matter of experimental determination.

In FIG. 2 the bottom 11 of the recess has been drawn at the same level as the flange 10. This means that when the package has been inserted in a cardboard sleeve (not shown) the article 2 rests on the bottom of this sleeve via the bottom 11 of the package.

It is also possible, however, to make the recess less deep so that the bottom 11 is at a higher level than the flange 10. In this manner the article floats, as it were, within the cardboard sleeve and is protected even better against fracture.

The embodiment according to FIGS. 4 and 5 practically entirely corresponds with that according to FIGS. 1 and 2. In this embodiment it is possible to use an angle $\alpha$ of 90° in order to obtain proper clearance from the vacuum drawing mould (not shown). In order to all the same positively hold the article 2 in the recess the side wall 12 thereof is formed with upwardly widening ribs 12a. These ribs 12a have the same function as the inwardly inclined side walls 12 in the embodiment according to FIGS. 1 and 2. It will be clear for each expert in vacuum drawing that for forming these ribs 12a corresponding grooves should be provided in the corresponding side walls of the vacuum drawing mould.

Also in the embodiment according to FIGS. 4 and 5 the bottom 11 may be situated at a higher level than the flange 10.

In both embodiments the width of the recess portions 14 may be smaller then has been drawn. The walls 12 of the left hand and the right hand portions of the recess may in fact practically abut. This benefits the stiffness of the package.

Although in the above description particular stress has been laid upon packing chocolate figures and more in particular chocolate figures covered with an aluminium foil it will be appreciated that the package may also be used for other articles. Thus, all kinds of plastic articles, dishes, plastic walls embossments, etc. are thought of.

The package 20 according to FIGS. 6 and 7 is particularly designed for chocolate letters. This package 20 is substantially in the form of a shallow shell, the open side of which is facing down. The bottom of the shell, i.e. the upper surface of the package, is indicated with the numeral 21. The long outer walls of the shell are indicated with 22 and the short ones with 23. Along the outer walls 22, 23 there is a further flange 24 which is of no essential significance for the package but has a stiffening effect on its upper edge.

In the top 21 an also rectangular recess is formed of which the bottom is indicated with 25, the short side walls with 26 and the long side walls with 27. The length and width of this rectangular recess are adapted to the configuration of a chocolate letter which is not represented in the drawing.

Preferably the bottom 25 is also situated at a slightly higher level than the flange 24. In the bottom 25 an embossment of 1–2 mm (not shown) may be provided.

Throughout its width the package is formed with a hinge line 28 along its short axis of symmetry.

It appears from FIGS. 6 and 7 that the long walls 27 of the recess are interrupted in the vicinity of the hinge line 28.

It appears from FIG. 7 that the short walls 26 of the recess are buckled. The lower portion 26a of each short wall 26 is inclined to the bottom 25 of the recess at an angle of less than 90°. The upper portion 26 is inclined to the bottom at an angle of more than 90°. The height of the lower portion 26a is about two thirds of the overall height of the wall.

Since as a result of the manufacture of a chocolate letter the peripheral edges thereof have a slight downward inclination it will be clear that the chocolate letter is firmly held between the wall portions 26a of the short walls 26. The wall portions 26b play no part in holding fast the article and therefore may safely be inclined to the bottom 25 of the recess at a greater angle than 90°.

The walls 27 of the recess are perpendicular to the bottom 25 or inclined thereto at an angle of more than 90°.

The package is manufactured and used in exactly the same manner as described with reference to FIGS. 1 to 5 so that there is no need for a further description thereof.

It is not necessary that the outer circumference of the package according to the invention is rectangular, although the rectangular shape does present advantages in inserting the package in a simple outer sleeve. The contour could for instance also be circular, in which case the package is placed in a round flat box. It is also conceivable to place the filled package on a cardboard sheet and then shrink a cover of plastic material or the like around the assembly.

What we claim is:

1. A package for an article having a peripheral edge in any desired shape, said package comprising a shell formed from a film and including a recess formed in one face of said shell for receiving the article therein, said recess including a bottom wall and a plurality of side walls and having a depth of at least equal to the greatest thickness of the article to be received therein, at least a portion of an opposite pair of said side walls forming an angle less than 90° with said bottom wall whereby said portion retains the article in said recess, a hinge line extending throughout said shell and being formed in said bottom wall between said pair of said side walls, said bottom wall being bendable about said hinge line to a position wherein said pair of side walls are spaced apart a distance such that said article can be inserted into said recess.

2. A package according to claim 1, characterized in that the said portion of the walls of the recess is formed by substantially vertical ribs which are inclined upwardly and inwardly to the walls themselves.

3. A package according to claim 2 characterized in that the side walls of the recess on which the ribs are formed are themselves inclined to the bottom wall at an angle of 90°.

4. A package according to claim 1 characterized in that said shell is formed with outer walls, the bottom wall of the recess being at a higher level than the lower edges of the outer walls of the shell.

5. A package according to claim 1, characterized in that the package has a rectangular exterior shape and the hinge line extends along the long axis of symmetry of the rectangle.

6. A package according to claim 1, characterized in that the recess is a rectangular shape including short side walls and the hinge line is parallel to the short side walls of the rectangular recess, at least a portion of said short side walls being inclined to the bottom of the recess at an angle which is smaller than 90°.

7. A package according to claim 6 having a rectangular exterior shape, characterized in that the hinge line extends along the short axis of symmetry of the rectangular package.

8. A package according to claim 6, characterized in that the short side walls of the recess are of buckled shape, the part of each short side wall adjacent to the bottom wall of the recess being inclined to the bottom wall at an angle which is smaller than 90°.

9. A package according to claim 8, characterized in that the height of the said part of each short wall is approximately 2/3 of the overall height of the short side wall.

10. A package according to claim 8, characterized in that the upper part of each short wall above the buckled line is inclined to the bottom at an angle which is larger than 90°.

11. A package according to claim 6, characterized in that the said portion of the short side walls of the recess which are inclined to the bottom at an angle which is smaller than 90° have ribs formed therein which extend in height in the direction of said short walls and are parallel to said short walls.

12. A package for an article having a peripheral edge in any desired shape including an axis of symmetry, said package comprising a shell formed from a film and including a recess formed in one face of said shell for receiving the article therein, said recess having an axis of symmetry coincidental with the axis of symmetry of said article when said article is received in said recess, said recess being formed with a bottom wall and a plurality of sidewalls, said sidewalls having a depth at least equal to the greatest thickness of the article to be received therein, at least a portion of said sidewalls on opposite sides of said axis of symmetry of said recess forming an angle of less than 90° with said bottom wall whereby said portions of said sidewalls retain the article in said recess, a hinge line extending throughout said shell and being formed in said recess and being generally coincident with the axis of symmetry of said recess, said bottom wall being bendable about said hinge line to a position wherein said portion of said sidewalls are spaced apart such that said article can be inserted into said recess.

* * * * *